June 27, 1950      A. HANNON      2,512,643
APPARATUS FOR PROCESSING WORKPIECES IN SOLUTION TANKS
Filed June 29, 1946      3 Sheets-Sheet 3
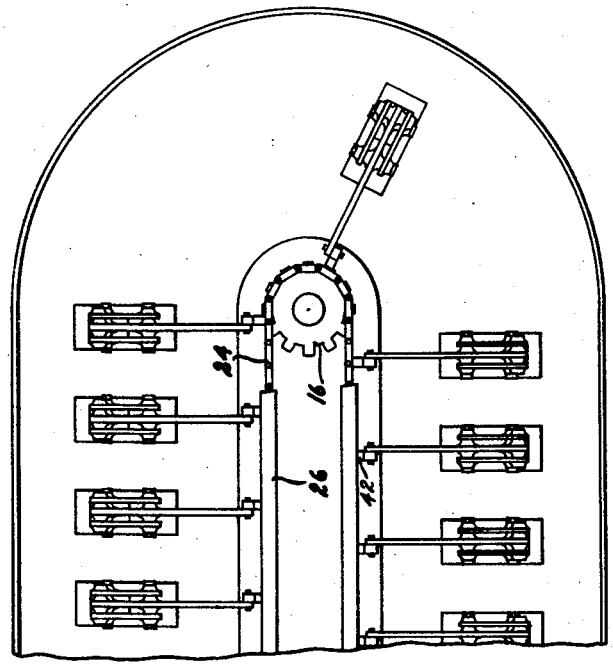
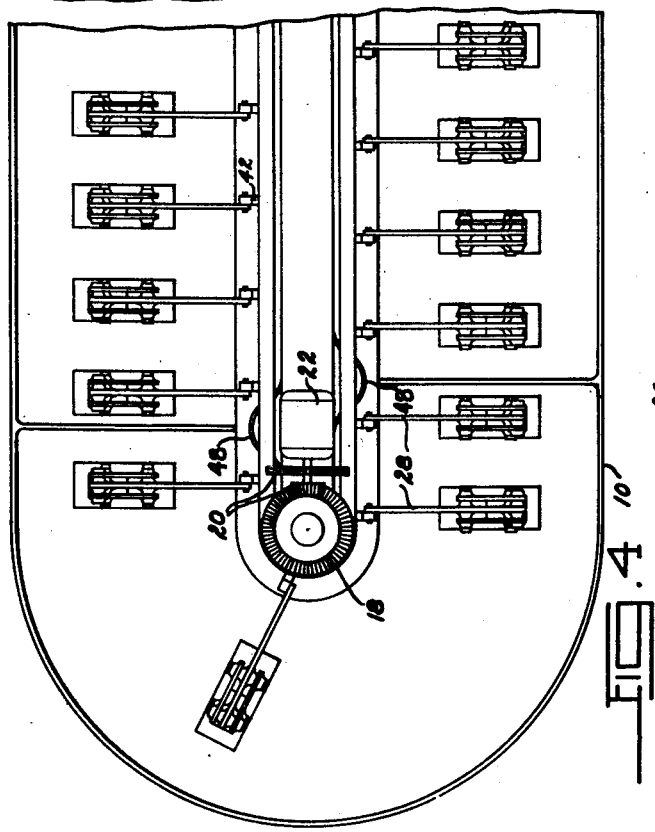
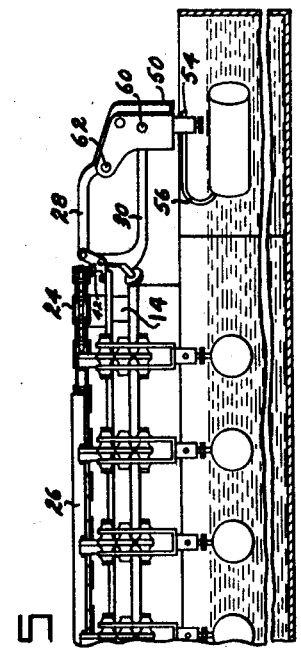
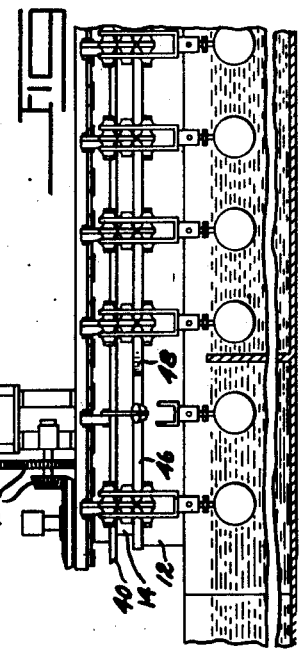
INVENTOR
ALBERT HANNON
BY
*Toulmin & Toulmin*
ATTORNEYS Patented June 27, 1950

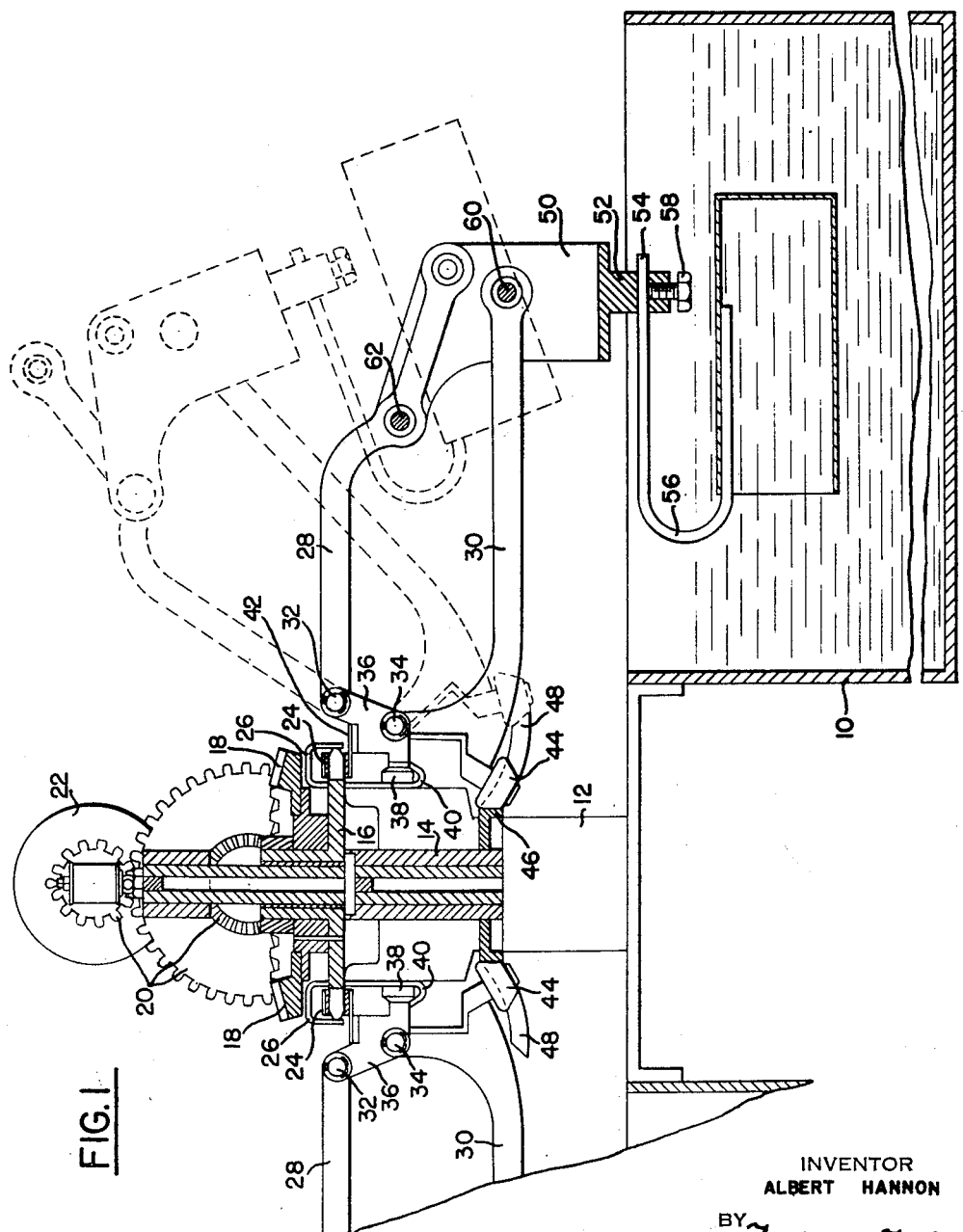

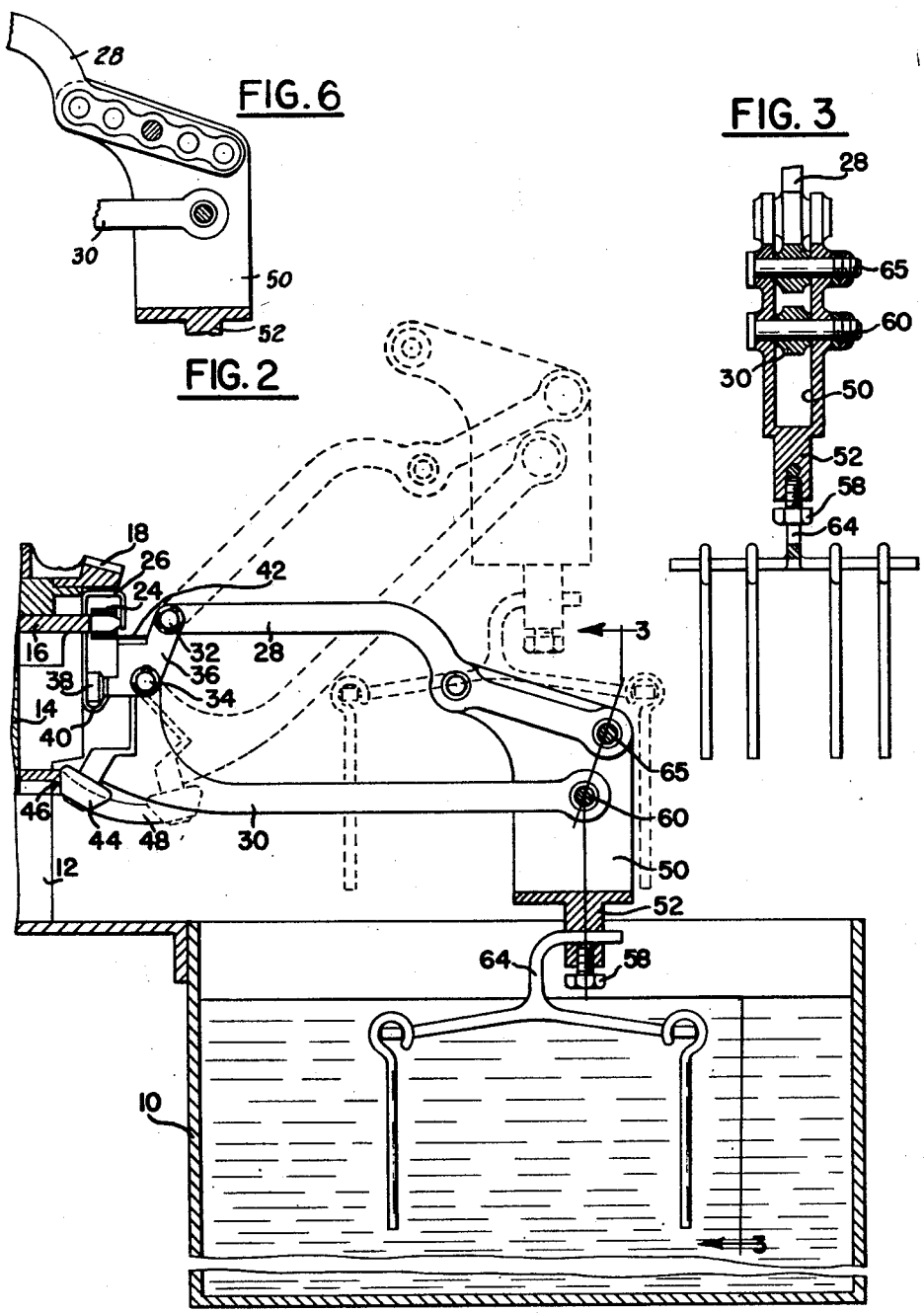

2,512,643

UNITED STATES PATENT OFFICE 2,512,643

APPARATUS FOR PROCESSING WORK-PIECES IN SOLUTION TANKS

Albert Hannon, Springfield, Ohio

Application June 29, 1946, Serial No. 680,489

6 Claims. (Cl. 134—70)

This invention relates to process equipment and, particularly, to equipment for processing workpieces through a plurality of baths or stations such as an electrolytic work cycle.

Many workpieces which are to be processed through a plurality of liquid baths in a work cycle are closed at one end or have hollow portions which it is desirable to treat in the same manner that the outside surfaces are treated. It is necessary in treating such workpieces to insure that the bath in which they are placed covers the entire surface to be treated and also that the workpiece is completely drained of the liquid before it passes to the next work station.

Accordingly, this invention has for its particular object an improved mechanism for supporting and conveying workpieces through a plurality of work steps, such as baths, and in such a manner that treatment of the entire surface is had.

Another object of this invention is to provide an apparatus for supporting and transferring workpiece through a plurality of liquid baths in a manner such that the workpieces are completely drained of one solution before proceeding to the next.

Still another object is the provision of an apparatus selectively adjustable for transporting workpieces from one bath to another and to hold them either in parallelism or to tilt them in passing between the baths.

It is also an object to provide a simple workpiece carrier for electrolytic processing equipment which is adapted for supporting and transporting a plurality of different types of workpieces through the processing machine.

These and other objects and advantages will become more apparent upon reference to the following description and the accompanying drawings in which:

Figure 1 is a view partly in section of a machine having a workpiece carrier according to this invention;

Figure 2 is a view similar to Figure 1 but showing the carrier adjusted for a different type of operation;

Figure 3 is a sectional view indicated by the line 3—3 on Figure 2;

Figure 4 is a plan view looking down on a typical processing machine employing this invention;

Figure 5 is a side view thereof with the near wall of the tank broken away; and

Figure 6 is a fragmentary view showing the modified manner of providing for a plurality of pivotal connections between the workpiece carrier and one of the actuating arms therefor.

Referring to the drawings, a processing machine with which this invention is adapted for use usually comprises a series of tanks or reservoirs which are arranged in a line or around an oval path as shown in Figures 1, 4 and 5. The tanks contain the various baths through which it is desired to process the workpieces and usually comprise cleaning, washing and electrolytic solutions.

In Figure 1 a tank of this nature is indicated at 10 and adjacent to the said tank is a frame 12 which may be stationarily supported on the tank or mounted on the floor adjacent the said tank. The frame 12 comprises a column 14 at either end each having rotatably mounted thereon a sprocket 16. At one end of the machine the sprocket 16 is secured to a gear 18 that is driven through a gear train 20 by a motor 22.

A chain 24 passes around both of the sprockets and is driven by the one thereof which is connected with the motor. The chain 24 is guided in its straight reaches in a track or channel 26 extending down each side of the frame 12.

For transporting the workpieces between the several tanks of the machine there are a plurality of pairs of arms 28 and 30 which extend outwardly from the frame 12 and overhang the processing tanks. The arms 28 and 30 are pivoted at 32 and 34, respectively, to a bracket 36 which is guided around the frame 14 by a roller 38 that rides in the channel 40 and by the strap 42 that connects with the chain 24. The roller 38 is rotatably attached to the bracket 36 and supports the weight of the work supporting mechanism while the strap 42 and chain 24 coact with the channel 26 to maintain the work supporting mechanism in the proper position.

The arm 30 also has thereon the roller 44 that bears on the track 46. The roller 44 and track 46 maintain the arms 28 and 30 at the proper level while the workpieces are in the solution, while the said roller and the cam indicated at 48 operate to elevate the said arms together with the workpieces carried thereby to the dotted position indicated in Figure 1 while the workpieces are being transported to the next tank.

Between the ends of the arms 28 and 30 there is supported a member 50 which has at its lower end a lug 52 through which passes the bar 54 of the workpiece supporting arm 56 which comprises a substantially U-shaped member adapted for supporting a hollow workpiece such as the cylindrical article shown. A set screw 58 retains the bar 54 in the lug 52.

The member 50 is preferably a U-shaped bracket which encloses the ends of the arms 28 and 30 and has a plurality of pivot points therein for receiving the pivot bolts which also pass through the said arms. In the arrangement shown in Figure 1 there are pivot bolts at 60 and 62 which are arranged to have substantially different spacing than the pivots 32 and 34 at the other ends of the arms. The arrangement is such that when the roller 44 is moved outwardly by the cam 48 to carry the arms 28 and 30 to their dotted position in Figure 1, the member 50 is tilted to depress the open end of the article being treated relative to its closed end and thereby to drain the solution therefrom completely.

Thus, when the workpiece is lowered into the next bath there is no residue from the solution of the last bath and the treatment thereof is rapid and each bath remains free of contamination. Optionally, the spacing of the pivots 60 and 62 relative to the pivots 32 and 34 could be such that when the workpiece is lowered into a bath, it was tilted to have the closed end somewhat lower than the open end which would facilitate the filling of the cavity so that the solution reached all parts thereof with the least difficulty.

In Figure 2 the device is shown in connection with the processing of the work members which it is desired to support and transport in parallelism. To this end, the lug 52 of the member 50 receives a bracket 64 which supports a plurality of workpieces which extend into the solution in the tank. For lifting and transporting the workpieces in parallelism, the member 50 is also lifted and transported in the same manner and this is accomplished by replacing the pivot pin 62 in Figure 1 by the pivot pin 65 which lies in the same relative position to the pivot pin 60 as the pivot 32 does to the pivot 34. Then, when the roller 44 rides up on the cam 48 to move the arms 28 and 30 to their dotted line position in Figure 2, the member 50 is moved in exact parallelism with its original position and the workpieces are also transported in parallelism.

It will be understood that if the treatment of the workpieces included electrolytic steps such as electrolytic cleaning, or electrodeposition, suitable electrical connections could be made to the workpieces through one or both of the arms 28 and 30 and the member 50 in the usual manner. It will also be apparent that the arrangement shown in Figure 1 is adapted for transporting a plurality of workpieces, if desired, rather than the single article illustrated.

It will be seen that this invention provides for a simple arrangement whereby a single workpiece supporting member can be utilized for processing workpieces which it is desired to tilt in their passage from one bath to another. It will be apparent also that the amount of tilting of the workpiece could be regulated by providing more than the number of pivot points shown, as shown in Figure 6, or by arranging the upper arm and the member 50 to have pivot receiving slots therein rather than pivot receiving apertures.

It will be understood that this invention is susceptible to modification in order to adopt it to different usages and conditions and, accordingly, it is desired to comprehend such modifications within this invention as may fall within the scope of the appended claims.

I claim:

1. In a processing machine having a solution tank; a pair of arms extending over said tank; a member adapted for supporting workpieces pivotally connected with the ends of said arms; means pivotally supporting the other ends of said arms and means for moving said arms upwardly about their last mentioned pivots; and means for adjusting the pivotal connection of one of said arms with said member whereby the said member may either be moved in parallelism or be tilted as said arms are actuated to lift said member vertically from the said tank.

2. In a processing machine having a solution holding tank; a movable bracket carried on a track adjacent said tank; a pair of arms pivoted to said bracket and extending over said tank; a member pivoted to the ends of said arms and adapted for supporting workpieces in said tank; and a plurality of pivot points for connecting one of said arms with said member whereby the elevation of said arms about their pivotal connection with said bracket is adapted for either tilting said member to drain open-ended workpieces supported thereby, or to lift said member in parallelism.

3. In a processing machine; a solution tank; a bracket movable along a track adjacent said tank; a pair of arms pivoted to said bracket and extending over said tank; a U-shaped member enclosing the ends of said arms and having a pivotal connection with one thereof; and a plurality of pivot points between said member and the other of said arms for selectively receiving pivot pins whereby the lifting of said arms to elevate said member from the said tank is operable to either retain said member in parallelism or to vary the angularity thereof to drain open-ended workpieces carried thereby.

4. In a processing machine; a series of solution tanks; a track adjacent said tanks; bracket means slidable on said track; a pair of arms pivotally connected with said bracket means and extending over said tanks; a U-shaped member enclosing the ends of said arms over said tanks; a plurality of pivot points adapted for pivotally connecting said member and said arms for varying the angularity of said member as it is lifted by said arms; power means of moving said bracket means along said track; and means responsive to the movement of said bracket for elevating said arms.

5. In combination; a bracket; a pair of arms pivoted to said bracket; a member at the other ends of said arms; a first pair of pivot receiving means for said member and arms parallel to and being spaced the same as the pivotal connection between the said brackets and the said arms; and a second pair of pivot receiving means for said member and arms spaced substantially differently than said first pair.

6. In combination; a workpiece supporting member; a pair of arms pivoted to said workpiece supporting member and normally movable in parallelism to lift said member in parallelism to its original position; and an auxiliary pivotal connection between one of said arms and said member for causing said arms to move out of parallelism during their lifting movement and to tilt said member.

ALBERT HANNON.

REFERENCES CITED

The following references are of record in the file of this patent:

UNITED STATES PATENTS

| Number | Name | Date |
| --- | --- | --- |
| 1,858,012 | Hannon | May 10, 1932 |
| 2,023,668 | Daw | Dec. 10, 1935 |
| 2,030,984 | Hannon | Feb. 18, 1936 |
| 2,256,560 | Hannon | Sept. 23, 1941 |